April 9, 1968

O. V. PAYNE

LOOMS OPERATING WITH MULTI-COLOR STATIONARY WEFT SUPPLIES 3,376,900

Filed Sept. 24, 1965

8 Sheets-Sheet 1

INVENTOR
OSCAR V. PAYNE

BY Walter J. Wakefield
ATTORNEY

April 9, 1968 O. V. PAYNE 3,376,900

LOOMS OPERATING WITH MULTI-COLOR STATIONARY WEFT SUPPLIES

Filed Sept. 24, 1965 8 Sheets-Sheet 2

INVENTOR
OSCAR V. PAYNE

BY Walter H. Wakefield

ATTORNEY

INVENTOR
OSCAR V. PAYNE
BY Walter H. Wakefield
ATTORNEY

April 9, 1968

O. V. PAYNE

LOOMS OPERATING WITH MULTI-COLOR STATIONARY WEFT SUPPLIES 3,376,900

Filed Sept. 24, 1965

8 Sheets-Sheet 4

INVENTOR
OSCAR V. PAYNE

BY Walter H. Wakefield
ATTORNEY

INVENTOR
OSCAR V. PAYNE
BY Walter H. Wakefield
ATTORNEY

INVENTOR
OSCAR V. PAYNE

April 9, 1968

O. V. PAYNE

LOOMS OPERATING WITH MULTI-COLOR STATIONARY WEFT SUPPLIES 3,376,900

Filed Sept. 24, 1965

8 Sheets-Sheet 7

INVENTOR
OSCAR V. PAYNE

BY Walter H. Wakefield
ATTORNEY

INVENTOR
OSCAR V. PAYNE
BY Walter H. Schofield
ATTORNEY 3,376,900
Patented Apr. 9, 1968

3,376,900

LOOMS OPERATING WITH MULTI-COLOR STATIONARY WEFT SUPPLIES

Oscar V. Payne, Greenfield, N.H., assignor to Crompton & Knowles Corporation, Worcester, Mass., a corporation of Massachusetts Filed Sept. 24, 1965, Ser. No. 489,869
15 Claims. (Cl. 139—122)

This invention relates to looms operating with outside or stationary weft supplies which are of diverse characters, such as different colors.

Patent No. 3,014,505 shows a loom limited in its operation to a single color of weft from each side of the loom. In that loom the weft cutter and clamp move from a position adjacent to the outer end of the shuttle when the latter is out of the warp shed to a position which is adjacent to the selvage at that side of the loom after the shuttle has been picked. The operation of the loom is such that there is necessarily an excess of weft drawn off as the weft clamp and cutter move away from their outer to their inner position with respect to the cloth and this requires a take-up which must be able to reprieve an amount of weft equal at least to the length of the shuttle.

It is the general object of the present invention to provide on each side of the loom a set of weft presenters which are mounted on a support that is pivoted at the rear end of a carrier lever which in turn is pivoted about a stationary axis in front of the lay, and lead the weft threads to the presenters along paths which are in part at least axial with respect to the pivot of the presenters and also to the pivot of the carrier lever. In this way the carrier lever can swing from a position remote from the selvage to a position adjacent to the selvage with very little if any excess pull-off of weft, thereby greatly reducing the need for slack take-up.

It is a further object of the invention to move a support for the presenter units angularly with respect to the carrier lever so that a selected presenter will be in a position for attachment of its weft to the outer end of the shuttle and thereafter be moved to a position adjacent to the selvage favorable for clamping and cutting of the weft.

It is a further object of the present invention to effect the turning of the support relative to the carrier lever due to swinging of a carrier from one of its extreme positions to its other extreme position.

It is a further object of the invention to provide each presenter with means for operating its clamp and cutter and to move the selected presenter in to operative position with respect to actuators which will operate the clamping and cutting features of the selected presenter.

It is a further object of the invention to provide a shuttle equipped with means for clamping a weft thread at each end thereof so that a loom can be provided with stationary weft supplies at each side thereof.

It is another object of the invention to provide a shuttle checking binder which will exert its restraining force on the top of the shuttle thereby leaving the front wall of the shuttle unobstructed for reception by the shuttle of a flat plunger which will assure proper location of the shuttle and also open the weft clamp at the outer end of the shuttle.

A further object of the invention relates to a selector mechanism which is controlled from a pattern chain in such manner that the swinging of the aforesaid carrier lever and the functions to be performed by such swinging can have sufficient time for proper operation.

It is another object of the invention to provide novel presenter and carrier lever units for use on looms of the type set forth.

With these and other objects to be set forth the invention resides in the arrangement and combination of parts shown in the accompanying drawings, wherein.

Figure 3:
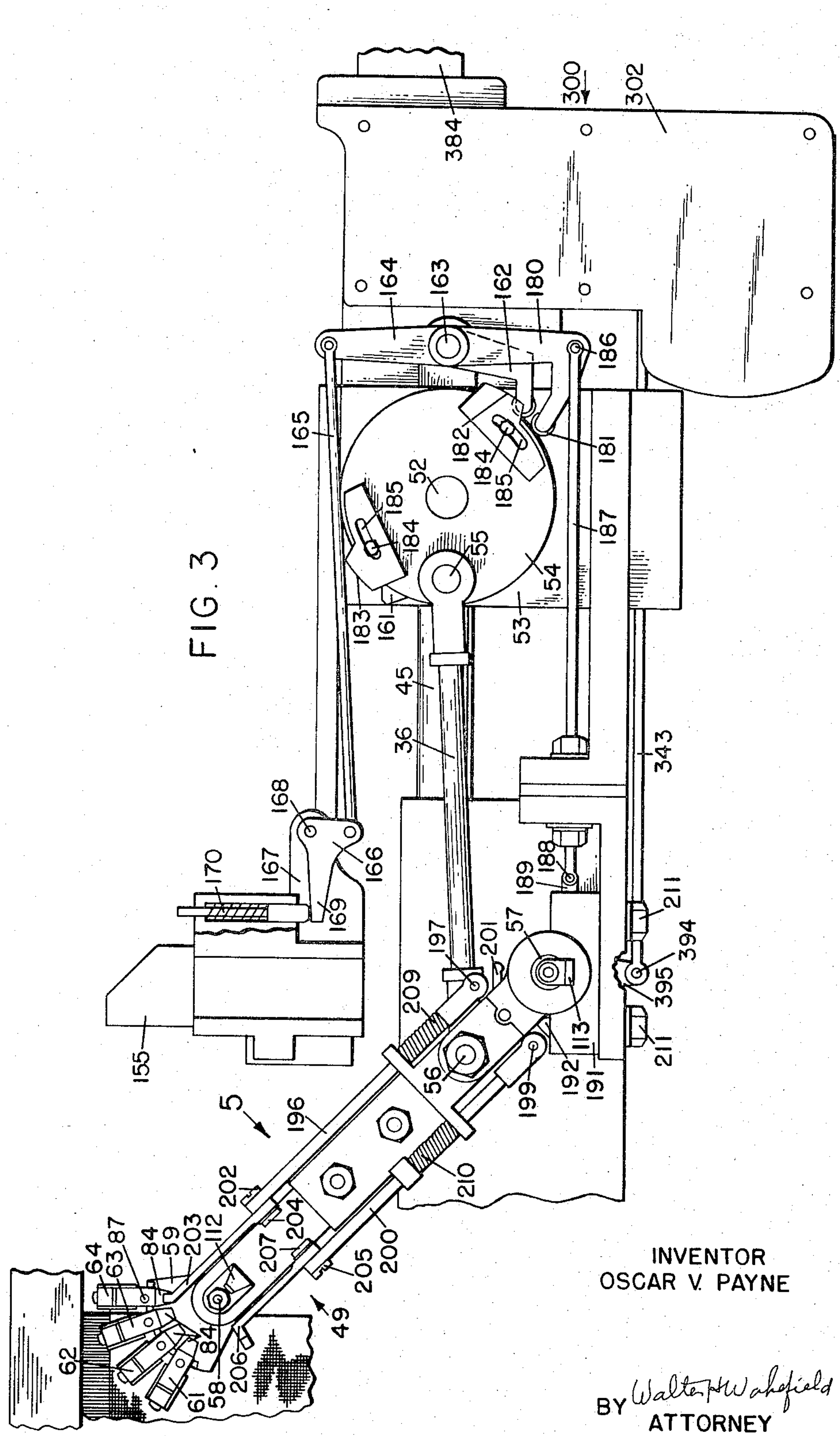
Figures 4, 19:
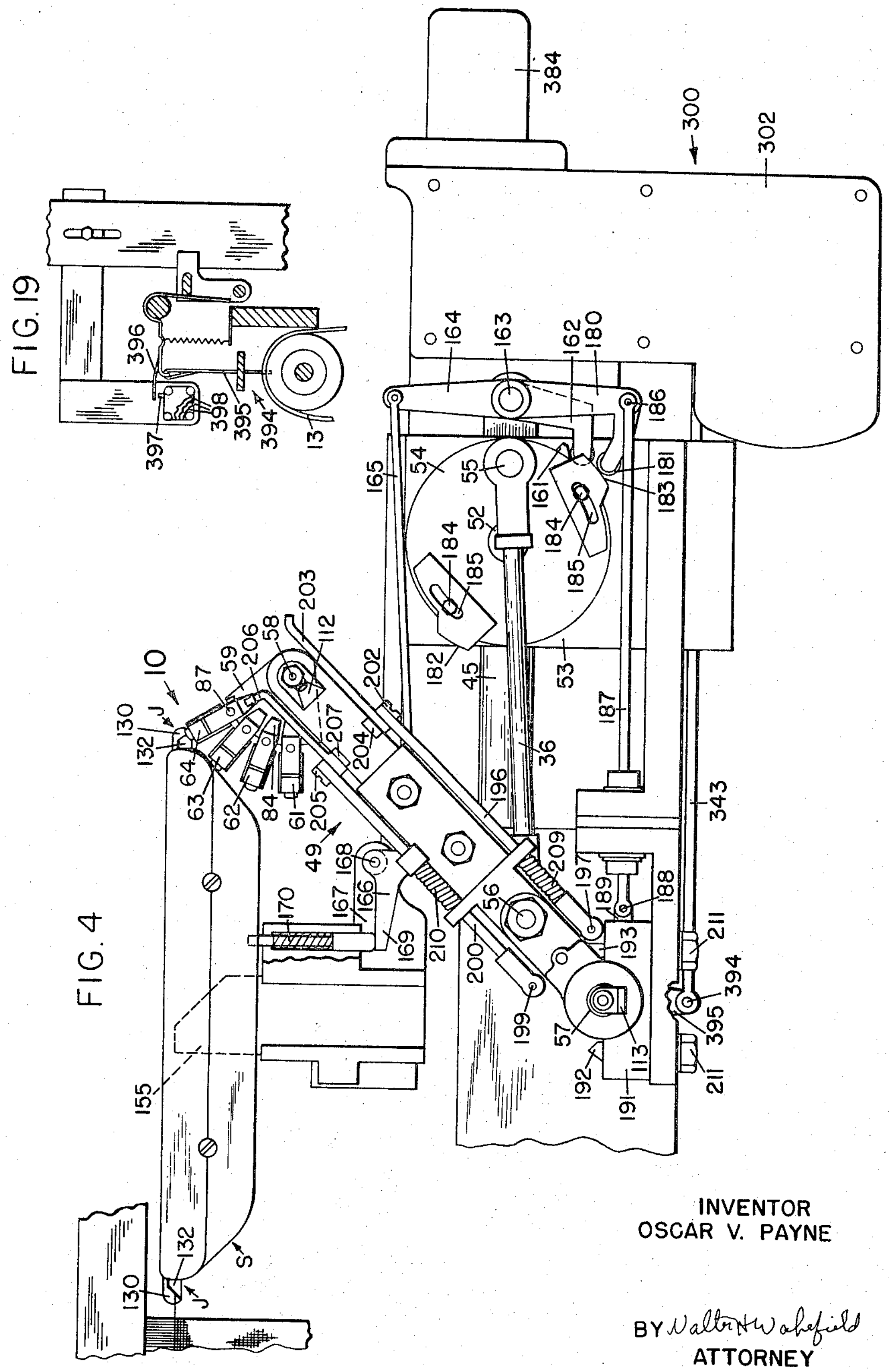
Figures 5, 8, 9:
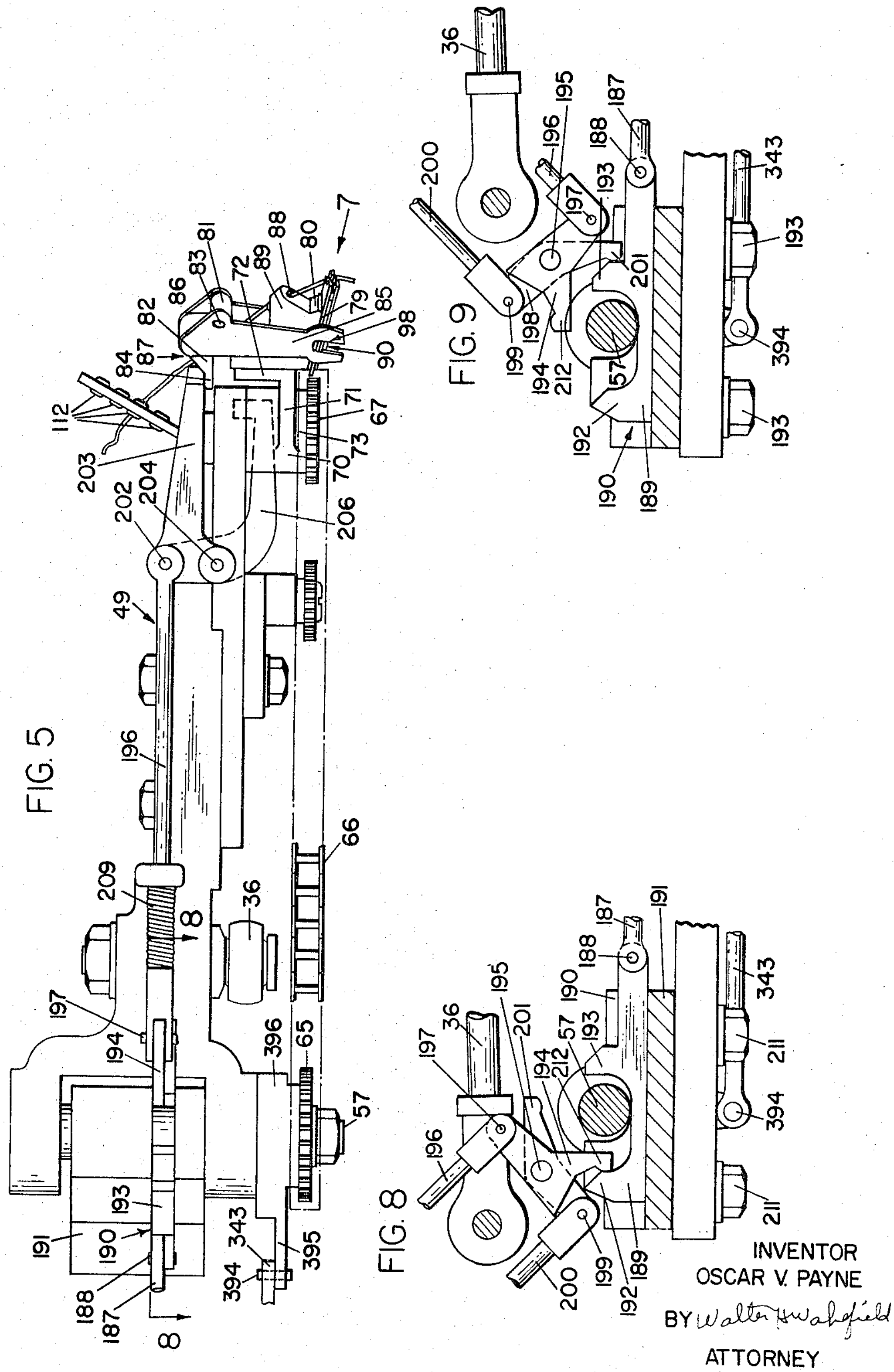
Figures 6, 7, 7A:
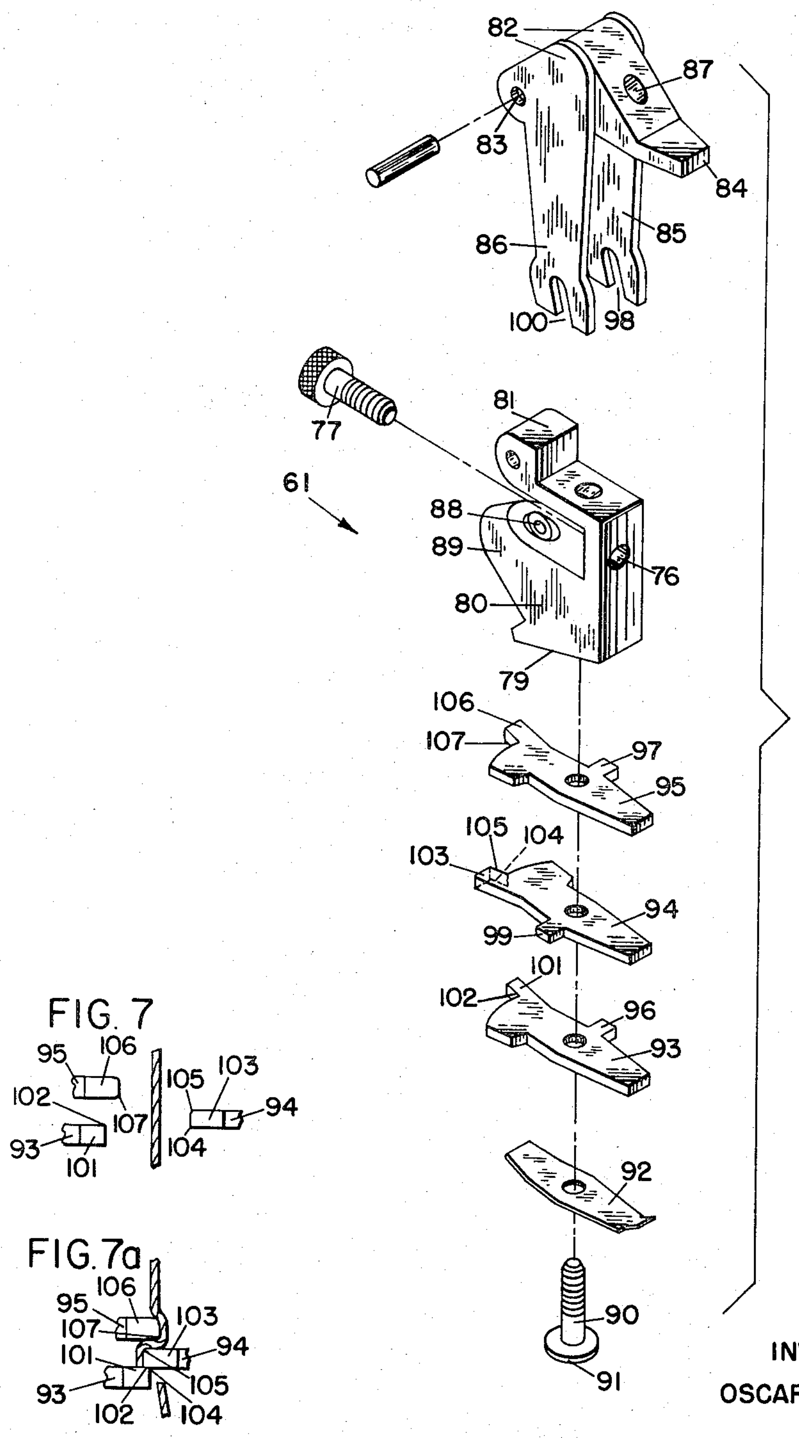

FIGURE 3 is a detail plan view of the forward right hand part of the loom on an enlarged scale, with the swinging carrier lever in a position adjacent to the right hand selvage of the cloth being woven, FIGURE 4 is a view similar to FIGURE 3 but with the carrier lever in the opposite position ready to attach a weft to the shuttle, FIGURE 5 is an enlarged side view of the carrier lever shown in FIGURE 4 looking in the direction of arrow 5, FIGURE 3, FIGURE 6 is an exploded perspective view of the cutting and clamping device on an enlarged scale;

FIGURE 7 is a fragmentary end view of the cutting blades with the yarn in position to be clamped and cut;

FIGURE 7*a* is a view similar to that shown in FIGURE 7, except that the yarn has been clamped and cut.

Figure 1:
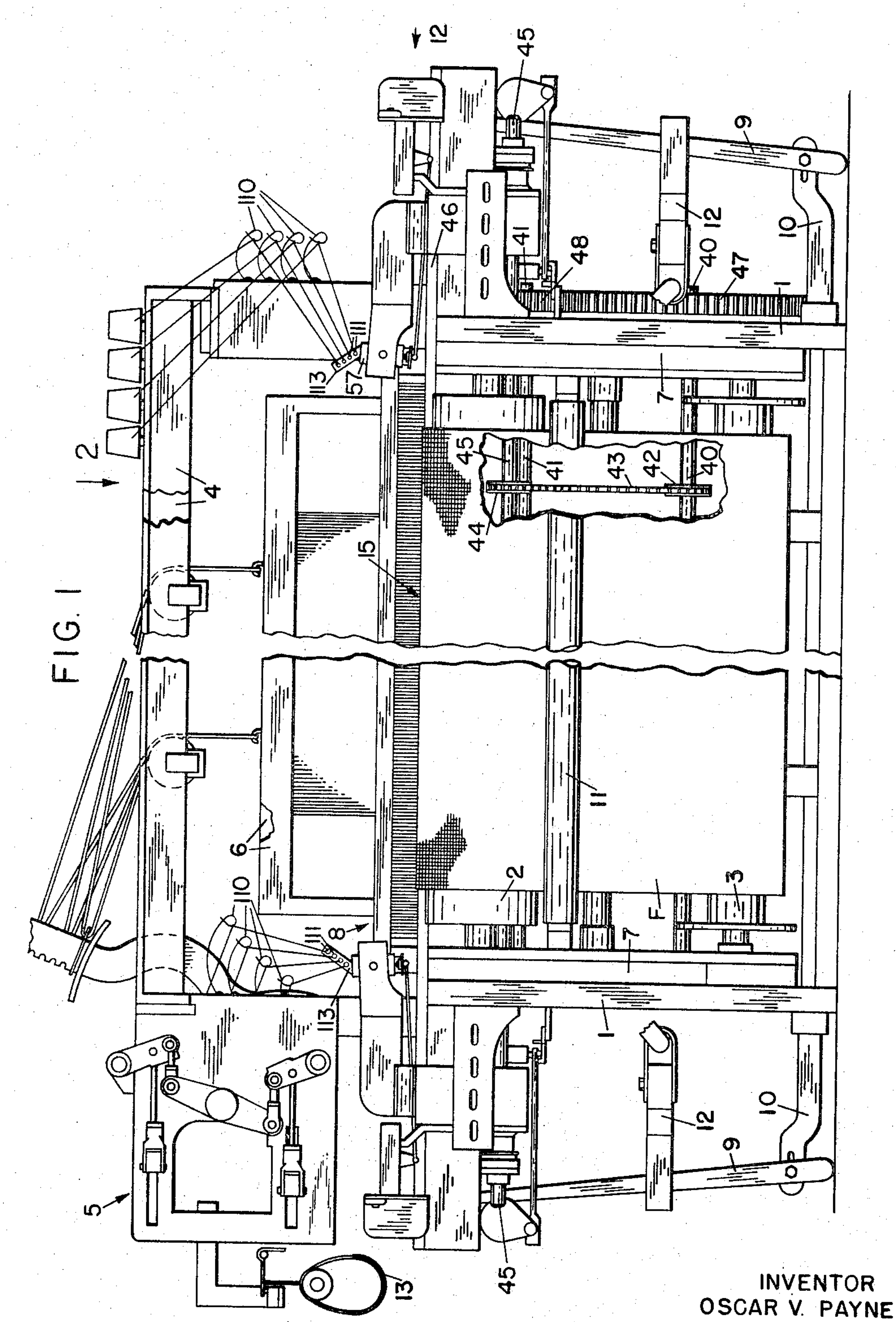
FIGURE 1 is a front elevation of a loom made according to my invention.
Figures 11, 18:
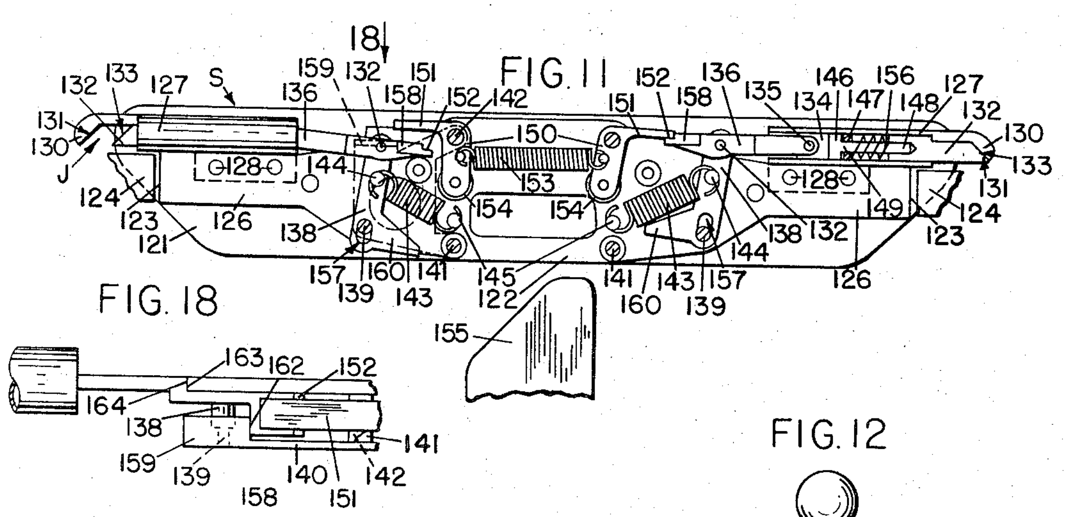
Figure 10:
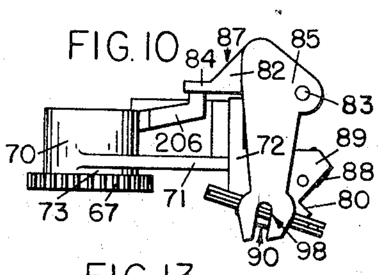
Figure 13:
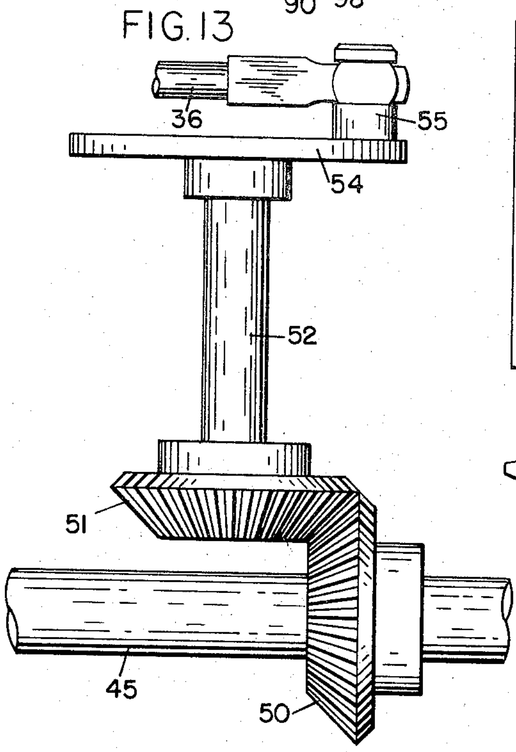
Figure 12:
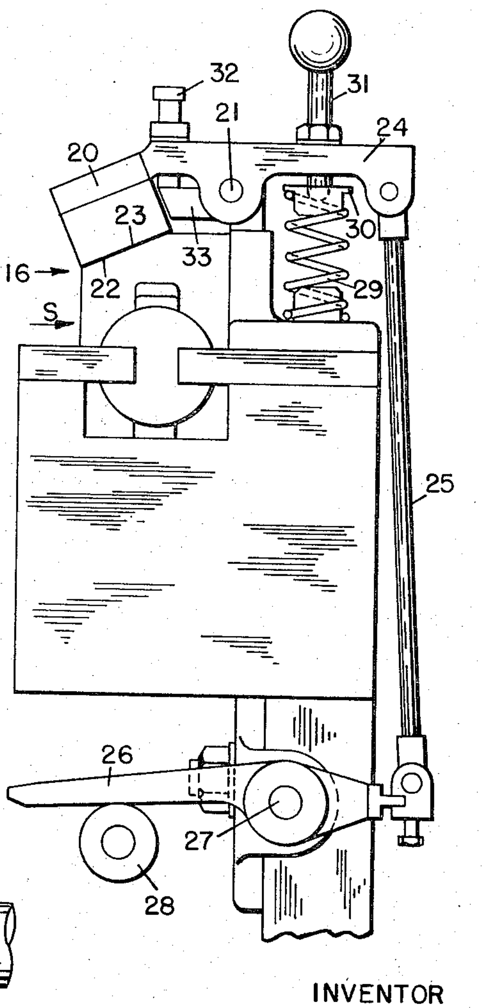
Figure 15:
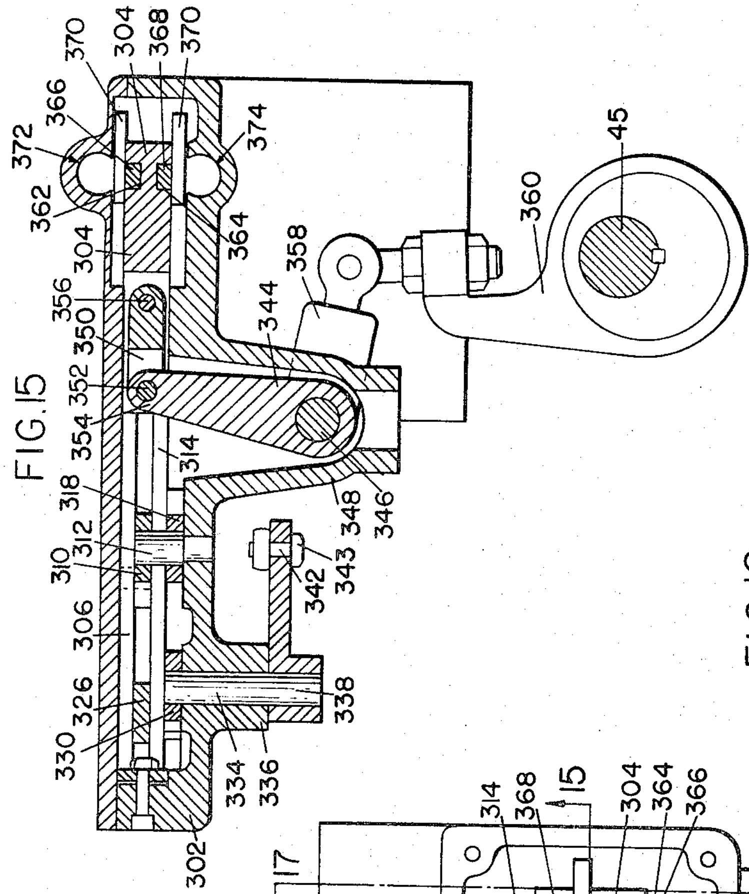
Figure 16:
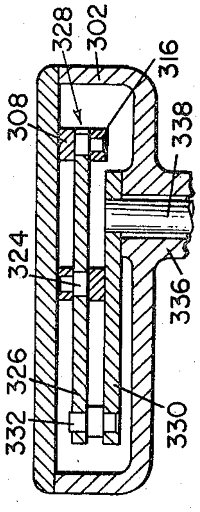
Figure 14:
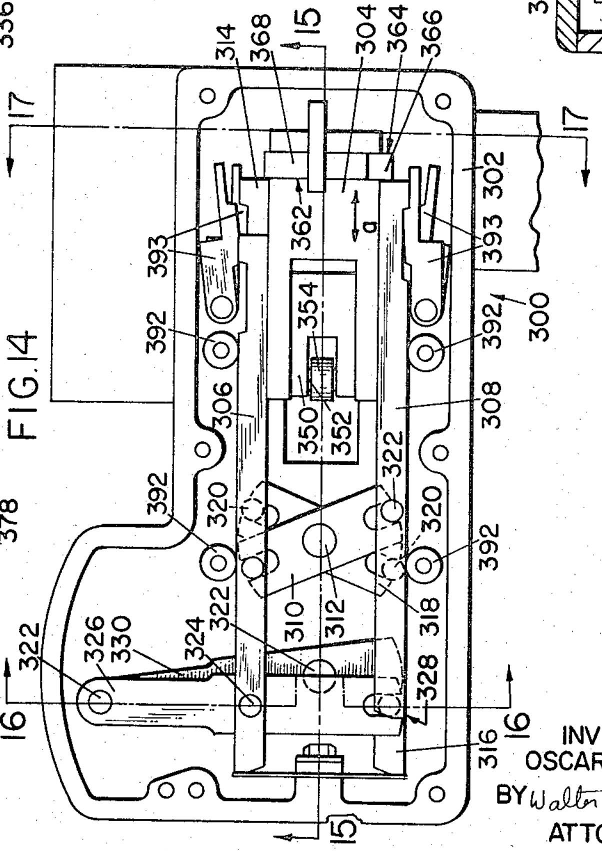
Figure 17:
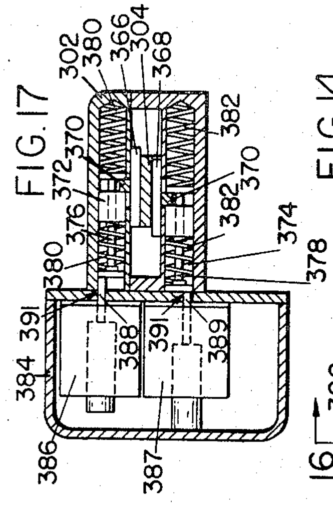

FIGURE 8 is a longitudinal section on line 8—8, FIGURE 5, showing parts of the mechanism for operating the clamping and cutting elements, FIGURE 9 is similar to FIGURE 8 but with the parts in a different position, FIGURE 10 is a view of the cutting and clamping element looking in the direction of arrow 10, FIGURE 4, FIGURE 11 is a plan view of the shuttle with the cover part thereof removed, FIGURE 12 is an enlarged end view of the shuttle binder looking in the direction of arrow 12, FIGURE 1, FIGURE 13 is a fragmentary view of the drive for the carrier lever, FIGURE 14 is a plan view of the color control mechanism with the top cover plate removed, FIGURE 15 is a section on line 15—15 of FIGURE 14, FIGURE 16 is a section on line 16—16 of FIGURE 14, and FIGURE 17 is a section on a reduced scale on line 17—17, FIGURE 14, FIGURE 18 is a fragmentary view looking in the direction of arrow 18, FIGURE 11, FIGURE 19 is a diagrammatic view of color control switches.

Figure 2:
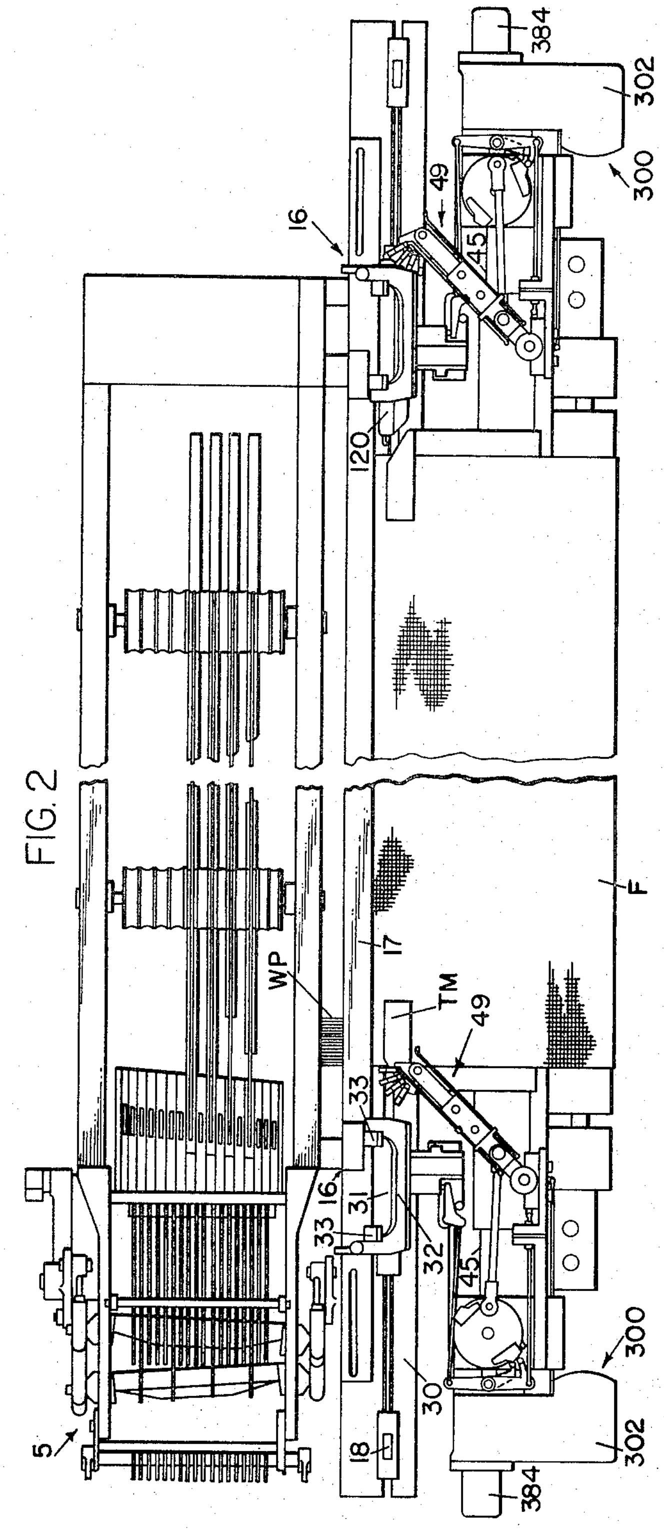
FIGURE 2 is a plan view looking in the direction of arrow 2, FIGURE 1.

Referring to FIGURES 1 and 2, the loomsides 1 support between them a take-up roll 2, a cloth roll 3 and arches 4. At one side of the loom a harness controlling mechanism 5 is connected in usual manner to harness frames 6 for raising and lowering warp threads WP. Layswords 7 support a lay 8, and picker sticks 9 are pivoted on rocker irons 10 in usual manner.

The fabric F is led down from the take-up roll behind a guide roll 11 supported between the loomsides and then goes to the cloth roll. Lug straps and sweep sticks 12 are provided for the picker sticks as usual. A pattern card 13 of usual construction is adjacent to the mechanism 5 and operates in customary manner to control certain parts already described as well as other parts to be described hereinafter.

Referring to parts of the loom more closely related to the present invention, the lay has a race plate 15 and a shuttle box 16 at each end thereof. Referring to FIGURE 12, each box has a binder 20 pivoted to the lay at 21 to swing up and down and the binder has a downwardly and forwardly slanting surface 22 over and relative to the race plate to fit the upper surface 23 of the shuttle.

A rear extension 24 on each binder is pivoted to a depending rod 25 connected to a lever 26 pivoted at 27 and engaging a rotary cam 28. A compression spring 29 between the lay and cup 30 exerts an upward force on screw 31 adjustable in extension 24, and stop screw 32 on binder 20 engages stop 33 fixed to the lay. The spring 29 acts to hold the binder down in checking position as the shuttle approaches the binder and cam 28 acts to lift the binder when the shuttle is to be picked, thereby permitting an easy pick.

Much of the loom is similar to a Crompton & Knowles loom which has gone into general use, namely the C–8. The loom has a bottom shaft 40 and a top shaft 41, see FIGURE 1. The bottom shaft has secured thereto a sprocket wheel 42 meshing with a chain 43 which in turn meshes with sprocket 44 on a horizontal shaft 45 extending substantially under breast beam 46. Sprockets 42 and 44 are of equal size and turn on two pick time. Meshing gears 47 and 48 on shafts 40 and 41, respectively, cause the top shaft to turn each pick or beat of the loom and the bottom shaft to turn every second pick. Any suitable loom drive means may be used.

A swinging carrier lever 49 is located on each side of the loom and since these levers and their associated parts are the same except of opposite hands only one will be described in detail, namely the lever 49 at the right hand end of the loom.

The right hand end of the shaft 45 (FIGURES 2, 3, 4 and 13) has secured thereto a bevel gear 50 meshing with an equal bevel gear 51 on an upright stub shaft 52 journaled in a casing 53 fixed with respect to loomside 10. The upper end of the stub shaft 52 has secured thereto a crank plate or disc 54 having fixed thereto an upstanding stud 55 to which is pivoted one end of a connector 36 the other end of which is pivoted at 56 to the previously mentioned carrier lever 49. The latter lever swings about a not quite vertical stud 57 fixed with respect to the loomside 10. The outer or rear end of lever 49 has pivoted on a stud 58, a support 59 for a plurality of weft thread presenters 61, 62, 63 and 64, reading, respectively, from left to right.

There is provided around the stud 57 (FIGURE 5) a selecting sprocket wheel 65 meshing with a chain 66 which extends rearwardly and is trained around a sprocket 67 fixed with respect to the support 59. As the carrier lever moves angularly the links of chain 66 change with respect to sprocket 65 (temporarily stationary) and also moves with respect to the carrier lever and thus cause turning of the rear sprocket 67 and support 59 relatively to carrier lever 49. The sprocket 65 can be moved to four different positions and be held stationary during swinging of lever 49, as will be described further hereinafter.

Turning more specifically to the support 59 and presenters 61–64 as shown in detail in FIGURES 5, 6, 7, 7*a* and 10, the support has a hub 70 around stud 58 and has a base 71 and an upright rear wall 72 concentric with stud 58. Sprocket 67 is rotatably secured to a downward extension 73 of hub 70.

The weft presenter units are alike and one of them, indicated at 61, will be described in detail herein. The presenters are made so they can be readily removed and replaced with a new presenter, if necessary. Each presenter includes a body 80 having at its upper end a horizontal arm 81 to which a clamp and cutter operating lever 82 is pivoted at 83. The lever 82 has a substantially horizontal arm 84 engaged by levers to be described and two substantially vertical side arms 85 and 86. Arm 84 has a weft thread guide eye 87 which is in substantial alignment with a second guide 88 in a lower arm 89 of body 80. Body 80 has a hole 76 therethrough for a screw 77 which is screw threaded into wall 72 and holds the unit in place.

Body 80 has at its bottom a foot 79 which has screw threaded thereinto a screw 90 having at its bottom a head 91 from which it extends upwardly successively through a leaf spring 92, a cutter blade 93, a cutter and clamping blade 94, and an upper clamping blade 95, as is shown in detail in FIGURES 6 and 7. By tightening the screw 90, screwing it upwardly into the foot, the spring 92 will increase the friction between the three blades above it. The lower cutter blade 93 and the upper clamping blade have projections 96 and 97 respectively which extend into a slot 98 (as seen in FIGURE 6) at the bottom of side arm 85, and the intermediate blade 94 has a projection 99 which fits into a slot 100 in the bottom of side arm 86. Blades 93, 94 and 95 are free to pivot about screw 90. This means that movement of arms 85 and 86 relative to body 80 and screw 90 will cause blades 93, 94 and 95 to pivot about screw 90. Thus a movement of arms 85 and 86 towards the yarn in FIGURE 6 will pivot blade 94 in a counterclockwise direction and blades 93 and 95 in a clockwise direction to clamp and cut the yarn. Movement in the opposite direction will open the clamp and cutter. The rear ends of the blades 93, 94 and 95 are their working ends, the lowest blade 93 as viewed in FIGURE 6 having at the right side thereof a lug 101 with a cutting edge 102, the blade 94 has at the left side a clamping and cutting lug 103 having a lower cutting edge 104 and an upper rounded clamping edge 105. The top blade 95 has a clamping lug 106 at the right side thereof with a rounded clamping edge 107. As seen in FIGURE 6 the lug 101 extends farther to the left than does lug 106 so that when the blades are moved during an operation the clamping lugs 103 and 106 will clamp a thread passing between them, and then at a slightly later time the cutting edge will sever the thread.

The loom set forth herein is shown as having provision for handling four different weft threads at each end of the loom, but the invention is not limited to this number, nor need it always use that number. A pick and pick fabric can be woven by the loom, either eight different colors or types, or four similar colors from each side so that filling mixing for each color can also be used. The wefts are supplied by stationary packages, a package for each of the eight clamping and cutting units. Each weft thread leads from its package through a tension device 110 and then through a guide eye 111 over the axis of stud 57 and then through a guide eye 112 over the axis of stud 58, thence to its selector and through the aligned guide eyes 87 and 88 thereof to the clamp elements of the presenter. The guide eyes 111 are mounted in a holder 113 secured in fixed position and the eyes 112 are mounted in a holder 113 secured to the carrier lever or arm. The groups of eyes 111 and 112 need not be in precise alignment with their respective stud axes, since the tension device 110 can take up some yarn that may be drawn off as excess, but the nearer the eye groups are aligned with their axes the less will be the excess of yarn drawn from the packages.

The shuttle used with the invention is shown in FIGURE 11. It has upper and lower parts 120 and 121, respectively, see FIGURE 2, made preferably of wood. Resting on the lower part 121 is a sheet metal support plate 122 extending for the greater part of the length of the shuttle having square ends 123 which fit against picking end stop plates 124 held fixed to the part 121. The ends of plate 122 are of reduced width as at 126.

Nipper guide cylinders 127 are held to narrow parts 126 of plate 122 by screws 128.

Both ends of the shuttle are alike except of opposite hands and the right hand end will be described in detail. A shuttle tip 130 is secured to the outer end of each cylinder and has an inclined clamping surface 131 to clamp a weft presented to it by a nipper plunger 132 made preferably of nylon and slideable in the adjacent cylinder 127 and having a nipper inclined 133 to match surface 131. The plunger 132 is fastened as indicated in FIGURE 11 to a head 134 slideable in the cylinder and pivotally at 135 to a link 136 pivoted at 137 to a lever 138. The latter is pivoted at 139 to a rivet 139 connecting plate 122 and a small auxiliary plate 140, see FIGURE 18. Two other rivets 141 and 142 connect plate 140 to plate 122. A coiled tension spring 143 connected between a stud 144 on lever 138 and a stud 145 on plate 122 urges lever 138 in a left hand or counterclockwise direction to pull the nipper 132 away from the surface 131.

A lock lever 150 pivoted on rivet 142 has a lock arm 151 to enter a notch 152 in link 136 and be held therein by coiled tension spring 153 and spring 143. A roll 154 on lever 150 is in the path of a plunger 155 when the parts are in the position shown in the right hand end of the shuttle, FIGURE 11. As the shuttle is moved forwardly by the lay the roll 154 on the right hand lock lever is engaged by plunger 155 to rock the associated lever 150 counterclockwise to lift lock arm 151 out of the associated notch 152 and thereby enable spring 143 to move parts 132, 133, 134 and 136 to the left, having reference to the right hand part of the shuttle, FIGURE 11. The parts previously in nipping position for the weft will then be as shown at the left end of the shuttle, FIGURE 11, and the weft jaw J defined by parts 131 and 132 is open, see the left end of the shuttle, FIGURE 11.

When the jaw J is in open position link 136 and lever 138 are in the lowered position shown at the left of FIGURE 11 as allowed by a slot 157 in lever 138. When in this position, an extending portion 158 on link 136 slips behind a lip 159 on auxiliary arm 140 and is positively locked against edge 162 of lip 159, see FIGURE 18. This locking is necessary due to inertial forces tending to close jaw J against spring 143. Link 136 has a right angle bend, producing an edge 163 which abuts an edge 164 of plate 122, see FIGURE 18, when link 136 is in the position shown at the lefthand side of FIGURE 11. This serves as a positive lock preventing the jaw from being opened any further than shown.

Head 134 is a U-shaped member having a T-shaped connecting pin 146 resting against its base 147. Pin 146 has a protecting portion 148 extending through a hole 149 in the base 147 and threaded into nipper plunger 132. A coil compression spring 156 extends between base 147 and nipper plunger 132 urging them apart. This construction provides that plunger 132 will be able to accommodate wefts of varying sizes.

Levers 138, see FIGURE 11, have short arms 160 which are actuated to effect clamping of a weft thread by the corresponding jaw J. The previously mentioned disc 54 rotating on two pick time has secured to the underside thereof a cam 161 which in the rotation of disc 54 rocks a lever 162 pivoted to a fixed stud 163 and extends rearwardly at 164 for pivotal attachment to a connector rod 165 the left end of which as viewed in FIGURE 3 is pivoted to a setting lever 166 pivoted at 168 to fixed structure 167. Lever 166 has an arm 169 which engages a plunger 170 slideable in structure 167 and pushes it rearwardly to be in position to engage arm 160 of the corresponding lever 138 on the forward beat of the lay when the shuttle is on the right hand side of the loom. In this way the jaw J is closed to grip the thread of the selected presenter. Each lever 138 has a slot 171 for the associated rivet pivot 139 which permits the link 136 to move from the position shown at the right in FIGURE 9 to the position shown at the left of that figure.

In order to operate the three thin sheet metal clamping and cutting elements at the bottom of the presenters there is provided a lever 180 pivoted at 163 and having a roll 181 to be engaged by equally spaced cams 182 and 183 secured to disc 54 for angular adjustment thereon by screws 184 tapped into the disc and passing through slots 185 in the cams 182 and 183. As disc 54 rotates, the cams act each beat of the loom to rock lever 180 counterclockwise as viewed in FIGURE 3 to cause pivot stud 186 to move rod 187 to the right, FIGURE 3. Referring to FIGURES 5, 8, 9 and 10, rod 187 is pivotally connected at 188 to an operating member 189 which is slideable to a slot 190 in a stationary block 191 mounted on a stationary part of the loom as at 211. Operating member 189 has two spaced projections 192 and 193 extending above block 190. Projections 192 is in contact with one arm 212 of a bell crank lever 194 pivoted at 195 to carrier lever 49 and pivotally connected by its other arm to a first actuating rod 196 at 197 when the lever 49 is in the weft retrieving position shown in FIGURE 3. A second bell crank lever, 198, also pivoted at 195 to carrier lever 49 is pivotally connected at 199 to second actuating rod 200 through one of its arms and its other arm, designated at 201, contacts projection 193, see FIGURE 9, when the lever 49 is in the position shown in FIGURE 4. First actuating rod 196 is pivotally attached at 202 to one end of depressing lever 203 which is pivoted at 204, on carrier lever 49, and is in operating alignment with horizontal arm **84*b* lever 82 when lever 49 is in the position shown in FIGURES 3 and 4. The second actuating rod 200 is pivotally connected at 205 to a lifting lever 206 which is pivoted at 207 on carrier lever 49 and is in operating alignment with horizontal arm 84 of lever 82 when lever 49 is in the position shown in FIGURES 4 and 10. When rod 187 is pulled to the right, with lever 49 positioned as shown in FIGURES 3 and 8, operating member 189 will also be pulled to the right causing rod 196 to be pushed in the direction of arrow B, FIGURE 8, against a compression spring 209. This action will move lever 203 clockwise in FIGURE 5 and depress horizontal arm 84 of lever 82 for cutting and clamping a weft thread. When rod 187 is pulled to the right with lever 49 positioned as shown in FIGURES 4 and 9, rod 200 will be pulled in the direction of arrow C, FIGURE 9, against a compression spring 210. This action will cause lever 206 to lift actuating horizontal arm 84 of lever 82 for releasing a weft thread. Compression springs 209 and 210 return and maintain levers 194 and 198** respectively in their positions shown in FIGURES 8 and 9.

Referring to FIGURES 14–17, there is shown a color control mechanism for selectively placing any one of the presenters 61–64 on the right hand side of the loom in active position. The color control unit on the lefthand side of the loom operates in the same manner but of opposite hand so it is deemed only necessary to describe the righthand color control mechanism.

Referring to FIGURES 14, 15 and 16 the color control unit is generally indicated by the reference character 300 and is shown in that figure with the cover removed to better illustrate the mechanism inside. The unit 300 has a housing 302 which contains a sliding block 304, two upper push slide bars 306 and 308, one disposed on either side of the sliding block and loosely connected by a yoke member 310 pivoted at 312, and two lower push bars 314 and 316 located below push bars 306 and 308, respectively, and also being loosely connected by a yoke member 318 located below yoke 310 and also pivoted at 312.

Yoke members 310 and 318 each have open ended slots 320 for loosely engaging pins 322 on the upper and lower slide bars respectively. Pivotally attached at 324 to slide bar 306 is an upper sweep arm 326 which also engages lower slide bar 316 through a pin slot connection at 328. A lower sweep arm 330 is pivotally connected at one end to upper sweep arm 326 at 332 and is fixed at its other end to a shaft 334 extending down through the housing 302 and rotatable in a bearing portion 336 of the housing. Fixed to the lower extending end 338 of shaft 334 is an output lever 340 which is pivotally connected to an output rod 343 at 342. Thus, the position of the push bars will determine the radial position of shaft 334, output lever 340, and output rod 343. The position of the output rod, through lever 395 and sprocket 65 serve to position the desired presenter to present its yarn to the shuttle.

A rocker lever 344 is fixed at one end to a shaft 346 pivoted in a lower extending portion 348 of housing 302. A link 350 is pivotally connected at one end at 352 to an upwardly extending portion 354 of rocker arm 344 and at its other end to sliding block 304 at 356. Also fixed to shaft 346 is an eccentric arm 358 which receives an oscillating motion once every pick from an eccentric drive arm 360 floating on shaft 45. This motion causes shaft 346 to rock back and forth once every pick and in turn causes block 304 to slide back and forth through rocker lever 344 and link 350 in the directions of arrow A, FIGURE 14.

Sliding block 304 has upper and lower grooves 362 and 364 respectively in which are slideable, upper and lower keys 366 and 368 respectively. Each key has an elongated projection 370 which extends outwardly and transverse to the direction of sliding of the key. Projections 370 of keys 366 and 368 extend into chambers 372 and 374 respectively in housing 304. Also located in chambers 372 and 374 are upper and lower plunger means 376 and 378 respectively and upper and lower springs 380 and 382 respectively. Plunger means 376 and 378 each have a collar 383 in sliding engagement with a projection 370. Fastened to one side of housing 302 is a solenoid housing 384 containing therein upper and lower solenoids 386 and 387 respectively each with a core having upper and lower projections 388 and 389 respectively.

Projections 388 and 389 extend through holes 390 in abutting wall 391 and push against plunger means 376 and 378, respectively, against the bias of springs 380 and 382 respectively. Energization of a solenoid will position its respective key to one side of its respective groove so that it extends beyond one edge of block 304, see for example key 366 in FIGURES 14 and 15. When a solenoid is de-energized its corresponding plunger means will be pushed by its respective spring, causing the corresponding key to be positioned so that it extends beyond the opposite edge of block 304 as shown for instance in FIGURES 14 and 17.

When block 304 is caused to make its regular sliding motion the projecting end of key 366 will slide the end of one of the push bars 306 and 308, 306 if solenoid 308 is energized and 308 if it is not. Whichever bar is struck the other will be pushed in the opposite direction because of the action of yoke 310. Bars 314 and 316 will be operated in the same manner through yoke 318. The disposition of a pair of push bars when a solenoid is energized is illustrated by bars 306 and 308 in FIGURE 14, and when a solenoid is de-energized as illustrated by bars 314 and 316. Bar 306 depending on its position will place upper sweep arm 326 in one of two positions through pivot point 324 and bar 316 will place the upper sweep arm in one of two positions through pin and slot connection 328.

The combined influence on upper sweep arm 326 by push bars 306 and 316 will make it possible to position it in any one of four different positions. The position of arm 326 will also determine the position of lower sweep arm 330 and consequently that of output rod 343. Rod 343 is pivotally connected at 394 to a selector lever 395 fixed to the hub 396 of previously mentioned sprocket 65 for rotating same. Also located in housing 302 are guide rollers 392 to keep the push bars in alignment and spring biased locking means 393 for each of the push bars to hold them in each of the color selecting positions. Locking means 393 functions like the well known spring detent to hold the push bars in place while under the usual load but will be cammed out of the locking position when the associated push bar is acted on by block 304 due to the slope of the projection of each of the pivoted members.

The operation of solenoids 386 and 307 are controlled switches 398 on the pattern mechanism, see FIGURE 19.

Referring to FIGURE 19 there is shown a portion of a pattern mechanism generally indicated at 394 wherein some of the ordinary pattern reading needles 395 are modified as shown. Needle 395 has a horizontal projection 396 which registers with a plunger 397 of a solenoid switch 398. When there is a hole in the portion of pattern card 399 being read, needle 395 will drop down to the dotted line position in FIGURE 19 and projection 396 will operate switch 398. If a hole does not appear, the reading needle 395 will remain in the full line position and switch 398 will not be operated. It is to be understood that there is a corresponding arrangement for controlling each solenoid.

The operation of the previously described loom will be apparent from a brief description starting with the assumption that the shuttle has just arrived at the right hand side of the loom. The nylon nipper 132 is against the clamping surface 131 at the lefthand end of the shuttle, thus holding the selected weft which has just been drawn through the warp shed by presenter 64 as shown in FIGURE 4. The weft for that presenter comes from the corresponding package, passes through a tension take-up, and thence through the two guide eyes of the presenter and then to the clamping elements, that is, the upper and middle elements at the bottom of the presenter. As the lay moves the shuttle forwardly with the nylon nipper 132 spaced from the clamping surface 131 at the right hand end of the shuttle, the parts 131 and 132 will pass on opposite sides of the weft from presenter 64 and cam 161 will have pushed lever 164 in a direction to effect rearward motion of plunger 170, causing it to strike arm 160 to force the link 136 outwardly, to the right, FIGURE 11, resulting in the nylon nipper at that end of the shuttle clamping the selected weft. The selected weft is now fastened to the outer end of the shuttle and immediately one of the cams 182 moves lever 180 and causes the upper and middle elements at the bottom of the presenter 61 to release the weft between them so that the weft will be free to be drawn through the weft guide eyes of the presenter. Conditions are now favorable for picking of the shuttle when the lay reaches the proper point for picking as it moves rearwardly.

The weft which had been drawn through the shed must be released from the shuttle. This is effected by engagement of flat plunger 155 with roll 154 on the left hand lever 150 which up to now in the flight of the shuttle to the right had held the lefthand nylon nipper locked against the weft touching surface 131 of the lefthand shuttle point. This happens after the warp sheds have crossed sufficiently to hold the weft just laid. The new weft is now attached to the outer end of the shuttle and inner end of the shuttle is free from the weft with its weft clamping jaws open.

As the lay moves rearwardly the carrier lever begins to swing rearwardly and when the lay reaches picking position, about top center, the weft will be deliverable from a presenter which is not yet in its rearmost position but which is nevertheless rearward of the fell of the fabric.

When the shuttle is picked it draws weft through the guide eyes of the selected presenter, the weft having been released from the presenter clamp. After the shuttle has gotten well into the warp shed the lay will have reached its rearmost position and the carrier lever will be at or near its rearmost position. Continued loom running will find the shuttle boxed at the opposite end and the carrier lever and active weft presenter at or near their lefthand extreme of travel.

At this time the cam 182 will be in the position shown in FIGURE 3 and presenter 64 will be more or less parallel to the selvage of the fabric F. Cam 182 will cause presenter 64 to clamp and then cut the weft extending from the guide eyes in presenter 64 to the selvage of fabric F after the warp sheds have crossed to hold the weft laid by the shuttle as it moves to the left through the warp shed. Presenter 64 is now again in possession of its weft so that the color selecting mechanism is now free to bring another presenter into active position before the next front center position. This means that the color selector mechanism has a whole pick in which to change presenters. The weft extends upwardly from the fabric between the clamping and cutting lugs of the presenter to the lower weft guide eye and is therefore placed for clamping and then cutting, as described.

The mehanism at the left hand end of the loom, as seen in FIGURE 1, then operates in a manner similar to that already described hereinbefore to attach a weft thread from the lefthand side of the loom to the shuttle and then pick the shuttle to the right.

From the foregoing it will be seen that the invention set forth hereinbefore provides multicolor wefts for both sides of the loom, the wefts for each side being fed through guide eyes aligned with the axis of the carrier lever so that little or no excess weft is drawn off the packages. A small tension is exerted on each weft to pull back any slight excess which may be pulled off. Each swinging carrier rocks from a position remote from the fabric where the shuttle is threaded on its outer end to an inner position near the fabric selvage where the weft of the selected presenter is cut at the selvage. The selector mechanism determines which presenter is to become active. It will also be noted that the support for the presenters is turned incident to swing motion of the carrier lever to move the selected presenter to its two positions. The weft clamp 132 on the shuttle has been described as made of nylon but the invention is not limited to this material. Also, the clamping and cutting elements at the bottoms of the presenters are operated by the cams 182 and 183 and rods and levers on the carrier lever. It will be seen further that an active presenter, due to the swinging of the carrier lever, at the time of shuttle flight, moves rearwardly as the lay moves the shuttle backwardly and then moves forwardly as the lay moves the shuttle toward the front. Also, the weft guides for the wefts which move rearwardly toward the end of the carrier levers are substantially aligned with the axis around which the presenters turn. Furthermore, when presenter 61 is at the left end of the loom the other presenters 62, 63 and 64 will be over at temple TM, the cloth being under the temple and presenters. This result is possible due to the fact that the top of the temple is very thin.

I claim:

1. In a loom having stationary packages of diverse weft and a gripper shuttle for gripping a weft and carrying it through a warp shed, selective weft presenting means comprising:
- (a) a moveable carrier on at least one side of said loom, moveable between a weft retrieval position adjacent the edge of the fabric being woven on said loom and a weft presenting position away from the edge of said fabric;
- (b) a plurality of weft presenters moveably mounted on said carrier so as to be moveable between active and inactive positions;
- (c) means to move said carrier between said yarn retrieval and presenting positions; and
- (d) selective control means for selectively moving said weft presenters into their active positions, whereby selected wefts will be presented to the gripper shuttle when the carrier is in its presenting position and the weft will be retrieved from said fabric edge when the carrier is in its retrieval position.

2. In a loom as set forth in claim 1 wherein there is a carrier on each side of said loom and they move together in the same direction so that when one is in its retrieval position, the other will be in its presenting position.

3. In a loom as set forth in claim 2 wherein the loom has a lay which moves backwardly and forwardly and the carriers are pivoted in front of the lay and swing from their gripping positions to their retrieval positions when the lay is in the rearward part of its motion and the shuttle is in flight.

4. In a loom as set forth in claim 1 wherein one end of the carrier is pivotally mounted on said loom and swings in an arc between presenting and retrieval positions.

5. In a loom as set forth in claim 4 wherein the presenters are mounted on a support pivoted on the carrier and the support turns relatively to the carrier incident to movement of the latter.

6. In a loom as set forth in claim 5 wherein the presenters are mounted on a support pivoted on the outer end of the carrier and turning means operatively connected to said support includes an element which has a forward end extending toward the pivot of the carrier, and holding means for the forward end of said element capable of holding said forward end in a fixed position for each of the diverse wefts, each position determining which presenter shall be in active position.

7. In a loom as set forth in claim 6 wherein said turning means includes a sprocket which fixed to said support and said holding means is a sprocket wheel concentric with the pivot of said carrier and said element is a chain meshing with said sprockets.

8. In a loom as set forth in claim 6 wherein the element of said turning means includes a rod pivotally connected at one end thereof to said support and pivotally connected at the other end thereof to said holding means.

9. In a loom as set forth in claim 4 wherein the diverse wefts pass through guide eyes substantially over said pivot so that there is very little excess weft drawn from said weft packages due to motion of said carrier.

10. In a loom having stationary packages of diverse weft; a gripper shuttle for gripping a weft and carrying it through a warp shed; and a reciprocating lay; a carrier unit comprising:
- (a) an elongated carrier lever, one end of which is pivotally mounted on said loom in front of said lay;
- (b) weft guiding means disposed substantially over said pivot;
- (c) a thread presenter disposed on the other end of said carrier lever comprising a weft guide, a weft clamp and a weft cutter; and
- (d) means disposed on said carrier lever to open the weft clamp after the shuttle has gripped its weft and before the shuttle has been picked.

11. In a loom as set forth in claim 10 wherein the means for opening the weft clamp comprises a rod which is guided on and extends along the carrier lever.

12. In a loom as set forth in claim 10 wherein said elongated lever has a support pivoted on the end thereof remote from said pivot, and a plurality of said presenters mounted on said support so that said clamp opening means can register with each presenter, one at a time, dependent upon the angular position of said support relatively to said body.

13. In a loom having a stationary weft supply; shuttle thread-up means comprising:
- (a) presenter means comprising:
  - (1) a body portion;
  - (2) lever means pivotally mounted on said body;

(3) weft clamp and cutter means movably mounted on one end of said body;

(4) means operatively connecting said lever to said clamp and cutter means;

(5) a weft guide eye mounted on an intermediate portion of said body;

(b) a shuttle having gripper jaws adapted to grip said weft between said clamp and said guide eye when the shuttle is properly boxed; and (c) means operable on said lever to open said clamp after said shuttle has gripped the weft and before the shuttle has been picked.

14. In a loom as set forth in claim 4 wherein said carrier swings in an arc of about 180° between its pivot and the lay of the loom.

15. In a loom as set forth in claim 14 wherein the lay reciprocates between front and back positions and the carrier moves toward the back of the loom as the lay moves backwards and forward as the lay moves forward.

References Cited

UNITED STATES PATENTS

| | | | |
|---|---|---|---|
| 3,014,505 | 12/1965 | Herard et al. | 139—126 |
| 3,227,384 | 1/1966 | Depuy | 139—224 |
| 3,249,127 | 5/1966 | Payne | 139—127 |

OTHER REFERENCES

Zangs: Gr. App. No. 1,024,028, pub., February, 1958.

HENRY S. JAUDON, *Primary Examiner.*

MERVIN STEIN, *Examiner.*